United States Patent
Numako (10) Patent No.: US 10,057,492 B2
(45) Date of Patent: Aug. 21, 2018

(54) PHOTOGRAPHING APPARATUS AND PHOTOGRAPHING CONTROL METHOD TO GENERATE A LOW-PASS FILTER EFFECT

(71) Applicant: RICOH IMAGING COMPANY, LTD., Tokyo (JP)

(72) Inventor: Norio Numako, Tokyo (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 306 days.

(21) Appl. No.: 15/031,875

(22) PCT Filed: Sep. 19, 2014

(86) PCT No.: PCT/JP2014/074877
§ 371 (c)(1),
(2) Date: Apr. 25, 2016

(87) PCT Pub. No.: WO2015/064242
PCT Pub. Date: May 7, 2015

(65) Prior Publication Data
US 2016/0269643 A1    Sep. 15, 2016

(30) Foreign Application Priority Data

Oct. 29, 2013  (JP) ................ 2013-223898

(51) Int. Cl.
*H04N 5/232*  (2006.01)
*H04N 9/04*  (2006.01)
(Continued)

(52) U.S. Cl.
CPC .......... *H04N 5/23287* (2013.01); *G03B 5/00* (2013.01); *H04N 5/2253* (2013.01);
(Continued)

(58) Field of Classification Search
CPC .......... H04N 5/23287; H04N 5/23258; H04N 5/23245; H04N 5/2253; H04N 9/04; H04N 9/045
See application file for complete search history.

(56) References Cited

U.S. PATENT DOCUMENTS 5,834,761 A * 11/1998 Okada ................ G03B 5/00
                                                           250/208.1
6,587,148 B1  7/2003 Takeda et al.
(Continued)

FOREIGN PATENT DOCUMENTS

JP    H08-114769 A    5/1996
JP    H09-116910 A    5/1997
(Continued)

OTHER PUBLICATIONS

U.S. Appl. No. 15/031,906 to Norio Numako, which was filed on Apr. 25, 2016.
(Continued)

*Primary Examiner* — Nelson D. Hernández Hernández
(74) *Attorney, Agent, or Firm* — Greenblum & Bernstein, P.L.C.

(57) ABSTRACT

In the photographing apparatus and the photographing control method, a processor can set one of a still-image photographing mode, and a specified photographing mode other than the still-image photographing mode. An LPF controller allows the optical low-pass filter effect to be obtained by moving the movable member via a driver when the processor has set a photographing mode to the still-image photographing mode, and prohibits an obtaining of the optical low-pass filter effect, obtained by moving the movable member via the driver, when the processor has set the photographing mode to the specified photographing mode.

10 Claims, 8 Drawing Sheets

(51) Int. Cl.
     *H04N 5/225*    (2006.01)
     *G03B 5/00*     (2006.01)
     *G03B 19/12*    (2006.01)

(52) U.S. Cl.
     CPC ..... *H04N 5/23245* (2013.01); *H04N 5/23258* (2013.01); *H04N 9/04* (2013.01); *H04N 9/045* (2013.01); *G03B 19/12* (2013.01); *G03B 2205/0038* (2013.01)

(56) References Cited

U.S. PATENT DOCUMENTS

| | | | |
|---|---|---|---|
| 7,853,135 B2 | 12/2010 | Uenaka | |
| 2005/0270401 A1* | 12/2005 | Hatano | H04N 5/2254 348/335 |

FOREIGN PATENT DOCUMENTS

| | | |
|---|---|---|
| JP | 2006-101452 A | 4/2006 |
| JP | 2006-323237 A | 11/2006 |
| JP | 2008-020691 A | 1/2008 |
| JP | 2008-035241 A | 2/2008 |
| JP | 2008-148178 A | 6/2008 |
| JP | 2008-193195 A | 8/2008 |
| JP | 2011-232650 A | 11/2011 |
| JP | 2014-225818 A | 12/2014 |

OTHER PUBLICATIONS

Search Report issued by WIPO in Patent Application No. PCT/JP2014/074877, dated Dec. 9, 2014.

* cited by examiner

1) Movement of Image Sensor in Frame 1

Fig.8A

2) Movement of Image Sensor in Frame 5

Fig.8B

PHOTOGRAPHING APPARATUS AND PHOTOGRAPHING CONTROL METHOD TO GENERATE A LOW-PASS FILTER EFFECT

TECHNICAL FIELD

The present invention relates to a photographing apparatus, having an LPF function, and a photographing control method which are capable of obtaining an optical low-pass filter effect by driving a movable member (shake-correction member) in an direction different (e.g., within a plane that is orthogonal to the optical axis) to that of an optical axis of a photographing optical system.

BACKGROUND ART

When using a digital camera to photograph an object that has periodicity, sometimes moire or false color that did not originally exist occurs due to periodic distortion between the object period and the pixel pitch. Conventionally, the occurrence of moire and false color was prevented by inserting an optical low-pass filter into the optical path of the photographing optical system to separate the photographing light rays into normal light rays and abnormal light rays (separated into 2 points or 4 points). However, since optical low-pass filters are expensive, and cause the resolving power and contrast to deteriorate, in recent years the number of digital cameras that do not use optical low-pass filters has been increasing.

Patent Literature 1 discloses a digital camera for preventing occurrence of moire and false color without using an optical low-pass filter. This digital camera is provided with an LPF function that obtains an optical low-pass filter effect by driving an image sensor, during an exposure, by approximately one pixel and in a predetermined path (e.g., a circular path or a square path), and receiving the light bundle of the object image on a plurality of pixels having different detection colors. The user (photographer) can choose whether to use the LPF function by driving the image sensor in order to remove moire and false color via a manually setting, based on the user's preference or taste, or not to use the LPF function and not drive the image sensor in order not to deteriorate the resolving power or contrast. Incidentally, it is already known to remove moire or false color by utilizing a hand-hake correction mechanism in a digital camera which carries out hand-shake correction by driving the image sensor; Patent Literature 1 is one such example.

CITATION LIST

Patent Literature

Patent Literature 1: Japanese Unexamined Patent Publication No. 2008-35241

SUMMARY OF THE INVENTION

Technical Problem

However, among digital cameras, there are many digital cameras that have various specified photographing modes (special photographing modes) in addition to a still-image photographing mode. Examples of specified photographing modes are: a movie-shooting mode and an HDR (High Dynamic Range) photographing mode, etc. Furthermore, it is typical for digital cameras to have a live-view mode serving as a photographing standby mode for the still-image photographing mode and the specified photographing modes.

According to the diligent research carried out by the present inventor, it was found that when the LPF function was used by driving the image sensor in the still-image photographing mode of the digital camera, moire and false color could be removed as intended; however, when the LPF function was used by driving the image sensor in the specified photographing modes or in the live-view mode of the digital camera, not only could moire and false color not be removed, there was even the case where the moire and false color would be accentuated, so that the image would appear unnatural.

For example, when the image sensor is driven during the movie-shooting mode or the live-view mode, due to the relationship between the frame rate and the driving frequency of the image sensor, time-periodic false color occurs in the movie or the live view image. Furthermore, in an HDR photographing mode, it is necessary to photograph a plurality of images at different shutter speeds; however, since there is a limit to the driving-speed of the image sensor, the driving of the image sensor cannot keep up with a high-speed shutter, so that the moire removal effect is reduced, thereby causing the HDR processed image to appear unnatural.

The present invention has been devised in view of the above-mentioned problems, and an object of the present invention is to provide a photographing apparatus and a photographing control method which, in a still-image photographing mode, can obtain a high-quality still image with moire and false color actively removed, and in a specified photographing mode can obtain a specified photographic image of reliable quality with adverse influence of moire and false color reduced as much as possible.

Solution to Problem

A photographing apparatus of the present invention is provided, including an image sensor, which converts an object image that is formed by a photographing optical system into electrical pixel signals; a driver configured to obtain an optical low-pass filter effect via an object light-bundle being incident on a plurality of pixels, having different detection colors, of the image sensor by moving a movable member (shake-correction member) in a direction that is different from an optical axis of the photographing optical system (e.g., in a plane that is orthogonal to the optical axis), wherein the movable member includes at least one of a lens element, constituting part of the photographing optical system, and the image sensor; a processor configured to set a photographing mode to one of a still-image photographing mode and a specified photographing mode other than the still-image photographing mode; and an LPF controller configured to allow the optical low-pass filter effect to be obtained by moving the movable member via the driver when the processor has set the photographing mode to the still-image photographing mode, and configured to prohibits an obtaining of the optical low-pass filter effect, obtained by moving the movable member via the driver, when the processor has set the photographing mode to the specified photographing mode.

The processor can set the photographing mode to a live view mode as a photographing standby mode in the still-image photographing mode and in the specified photographing mode, and the LPF controller can prohibit an obtaining of the optical low-pass filter effect, obtained by moving the movable member via the driver, when the processor has set the photographing mode to the live view mode.

The specified photographing mode can include at least one of a movie-shooting mode and an HDR photographing mode.

The photographing apparatus of the present invention can include an LPF operation switch for carrying out a switching operation between obtaining and not obtaining the optical low-pass filter effect, obtained by moving the movable member via the driver, wherein the LPF controller activates the operation of the LPF operation switch when the processor has set the photographing mode to the still-image photographing mode, and deactivates the operation of the LPF operation switch when the processor has set the photographing mode to the specified photographing mode.

The specified photographing mode can include a movie-shooting mode, and the processor can cancel the setting of the movie-shooting mode and set the photographing mode to the still-image photographing mode when a shutter release button is depressed during a movie-shooting operation in the movie-shooting mode.

A photographing control method of the present invention is provided, including an image sensor, which converts an object image that is formed by a photographing optical system into electrical pixel signals; and a driver configured to obtain an optical low-pass filter effect via an object light-bundle being incident on a plurality of pixels, having different detection colors, of the image sensor by moving a movable member (shake-correction member) in a direction that is different from an optical axis of the photographing optical system (e.g., in a plane that is orthogonal to the optical axis), wherein the movable member includes at least one of a lens element, constituting part of the photographing optical system, and the image sensor. The photographing control method includes setting one of a still-image photographing mode and a specified photographing mode other than the still-image photographing mode; and an LPF control which allows the optical low-pass filter effect to be obtained by moving the movable member via the driver when the photographing mode is set to the still-image photographing mode, and which prohibits an obtaining of the optical low-pass filter effect, obtained by moving the movable member via the driver, when the photographing mode is set to the specified photographing mode.

The photographing mode can be to a live view mode as a photographing standby mode in the still-image photographing mode and in the specified photographing mode; and the LPF control can prohibit an obtaining of the optical low-pass filter effect, obtained by moving the movable member via the driver, when the photographing mode is set to the live view mode.

The specified photographing mode can include at least one of a movie-shooting mode and an HDR photographing mode.

The photographing control method of a photographing apparatus can further include performing a switching operation between obtaining and not obtaining the optical low-pass filter effect, obtained by moving the movable member via the driver. The LPF control can activate the operation in said switching operation when the photographing mode is set to the still-image photographing mode, and can deactivate said switching operation when the photographing mode is set to the specified photographing mode.

The specified photographing mode can include a movie-shooting mode, and the setting of the movie-shooting mode can be cancelled and the photographing mode be set to the still-image photographing mode when a shutter release button is depressed during a movie-shooting operation in the movie-shooting mode.

Advantageous Effects of the Invention

According to the present invention, a photographing apparatus and a photographing control method can be achieved, in which a high-quality still image with moire and false color actively removed can be obtained in a still-image photographing mode, and a specified photographic image of reliable quality with adverse influence of moire and false color reduced as much as possible can be obtained in a specified photographing mode.

EMBODIMENT

An embodiment of the photographing apparatus according to the present invention applied to a digital SLR camera 10 will be hereinafter discussed with reference to FIGS. 1 through 9.

Figure 1:
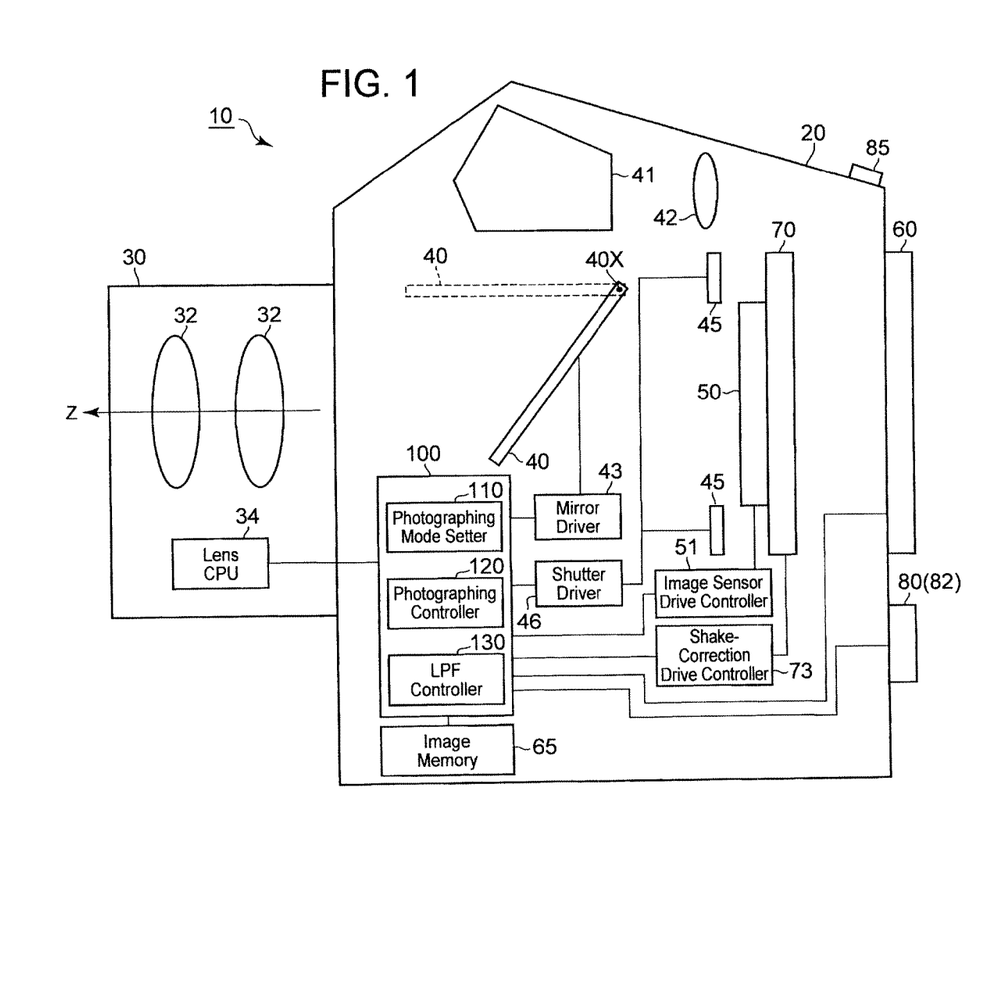
FIG. 1 is a schematic view showing a configuration of a digital SLR camera (photographing apparatus) according to the present invention.

As shown in FIG. 1, the digital camera 10 is provided with a camera body 20, and an interchangeable photographing lens 30 which is detachably attached to the camera body 20.

The interchangeable photographing lens 30 is provided with a photographing lens group (photographing optical system/movable member/image-shake correction member) 32, and a diaphragm (not shown in the drawings), in that order from the object side (left side of FIG. 1) to the image side (right side of FIG. 1). Furthermore, the interchangeable photographing lens 30 is provided with a lens CPU 34 which stores various information such as focusing information and lens-position information of the photographing lens group 32, and aperture information, etc., of the diaphragm (not shown in the drawings). In a state where the interchangeable photographing lens 30 is mounted onto the camera body 20, the various information stored by the lens CPU 34 is read into a camera CPU 100 of the camera body 20 via mount contacts (not shown in the drawings). Note that although FIG. 1 depicts the photographing lens group 32 as two lens elements, in practice the photographing lens group 32 can include three or more lens elements, e.g., a stationary lens element, a zoom lens element that moves during zooming, and a focusing lens element which moves during focusing, etc.

The camera body 20 is provided with a movable mirror (quick-return mirror) 40, a shutter 45, and an image sensor (movable member/image-shake correction member) 50, in that order from the object side (left side of FIG. 1) to the image side (right side of FIG. 1). A pentaprism 41 is provided above the movable mirror 40, and an eyepiece lens element 42 is provided on the exit-surface side of the pentaprism 41.

The movable mirror 40 is configured by a mirror body (not shown in the drawings) being mounted in a mirror-holding frame (not shown in the drawings), and the movable mirror 40 is supported by being pivotally-rotatable about a rotational pivot 40X inside a mirror box (not shown in the drawings). The movable mirror 40 is rotatably drivable about the rotational pivot 40X, between a mirror-down position shown as a solid line in FIG. 1 and a mirror-up position shown as a broken line in FIG. 1, via a mirror driver 43 under the control of the camera CPU 100. When the movable mirror 40 is at the mirror-down position, the object-emanating light incident from the photographing lens group 32 reflects off the movable mirror 40 toward the pentaprism 41. The object-emanating light reflected by the movable mirror 40 is converted into an erected image by the pentaprism 41, and can be viewed from the eyepiece lens element 42. When the movable mirror 40 is at the mirror-up position, the object-emanating light incident from the photographing lens group 32 passes through the shutter 45 and toward the image sensor 50.

The shutter 45 is configured of two shutter curtains: a leading curtain and a trailing curtain. The shutter 45 allows object-emanating light to pass therethrough toward the image sensor 50 via the leading curtain and the trailing curtain being driven by a shutter driver 46 at a predetermined time difference under the control of the camera CPU 100. The exposure time is determined by the predetermined time difference by which the leading curtain and the trailing curtain of the shutter 45 are driven.

The driving of the image sensor 50 is controlled by an image-sensor drive controller 51 under the control of the camera CPU 100. When the movable mirror 40 is at the mirror-up position, the object image that is formed by the object-emanating light that is incident from the photographing lens group 32 and passes through the shutter 45 is formed onto a light-receiving surface of the image sensor 50. The object image that is formed on the light-receiving surface of the image sensor 50 is electrically converted into pixel signals via a large number of pixels, arranged in a matrix, and is output as image data to the camera CPU 100 via the image-sensor drive controller 51. The camera CPU 100 performs predetermined image processing on the image data that has been input therein from the image sensor 50; and this processed image data is displayed on an LCD 60 and is stored in an image memory 65. The image memory 65 refers to, e.g., a memory which can output image data to an external device such as a PC, etc., via a USB cable, or to a memory card, such as a flash memory, etc., which is insertable/removable from the digital camera 10 (camera body 20), and does not refer to a temporary storage memory (volatile memory) such as a DRAM, etc., for temporal storage for processing an image received during a live view to be displayed in the LCD 60.

Figure 2:
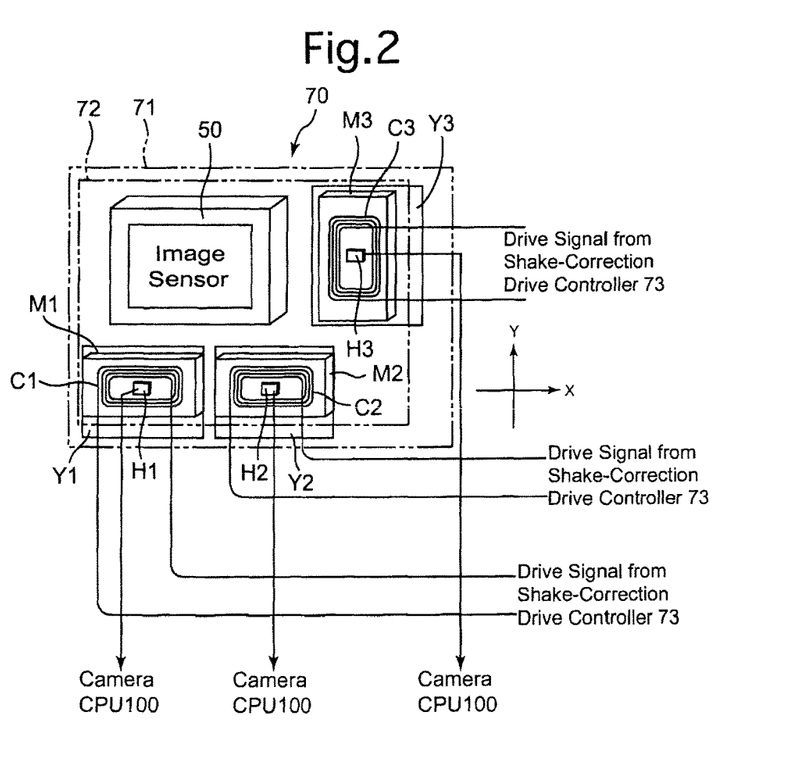
FIG. 2 is a block diagram showing a configuration of an image shake correcting device (driver).
Figure 3:
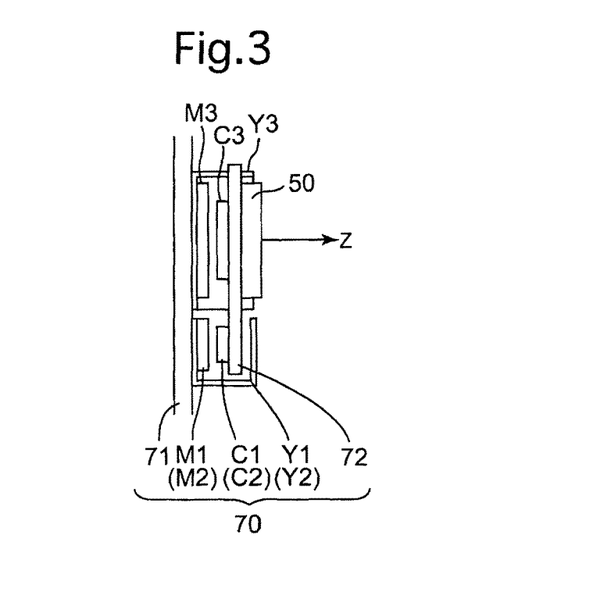
FIG. 3 is a side elevational view showing the configuration of an image shake correcting device (driver).

As shown in FIGS. 1 through 3, the image sensor 50 is mounted onto an image-shake correction device (driver, driving mechanism) 70 so that the image sensor 50 is movable in an x-direction and a y-direction (two orthogonal directions), which are orthogonal to an optical axis Z of the photographing optical system. The image-shake correction device 70 is provided with a mount support plate 71 which is mounted onto a structural member such as a chassis, etc., of the camera body 20; a movable stage 72, onto which the image sensor 50 is mounted, which is slidable relative to the mount support plate 71; magnets M1, M2 and M3 mounted onto the mount support plate 71 on the side thereof that faces the movable stage 72; yokes Y1, Y2 and Y3 which are made of a magnetic material and are mounted onto the mount support plate 71 to face the magnets M1, M2 and M3 with the movable stage 72 positioned between the magnets M1, M2 and M3 and the yokes Y1, Y2 and Y3, thereby forming a magnetic circuit between the yokes Y1, Y2 and Y3 and the magnets M1, M2 and M3, respectively; and drive coils C1, C2 and C3, mounted onto the movable stage 72, which each generate a driving force by receiving an electric current within the magnetic field of the magnetic circuit. The movable stage 72 (image sensor 50) is driven relative to the mount support plate 71 within a plane that is orthogonal to the optical axis by applying alternating drive signals to the drive coils C1, C2 and C3. The alternating drive signals that are applied to the drive coils C1, C2 and C3 are controlled by the camera CPU 100 and are generated by a shake-correction drive controller (drive-signal generator) 73.

In the illustrated embodiment, a magnetic driver configured of the magnet M1, the yoke Y1 and the drive coil C1, and a magnetic driver configured of the magnet M2, the yoke Y2 and the drive coil C2 (two magnetic drivers) are arranged along a long-side direction (horizontal direction/x-direction) of the image sensor 50 at a predetermined distance therebetween; accordingly, the movable stage 72 can be driven in the y-direction. Furthermore, a magnetic driver configured of the magnet M3, the yoke Y3 and the drive coil C3 (one magnetic driver) is arranged along a short-side direction of the image sensor 50 orthogonal to the long-side direction thereof (vertical direction/y-direction); accordingly, the movable stage 72 can be driven in the x-direction.

The mount support plate 71 is further provided with Hall sensors H1, H2 and H3 arranged in the close vicinity of the drive coils C1, C2 and C3, respectively (within the central spaces thereof). The Hall sensors H1, H2 and H3 detect the magnetic force of the magnets M1, M2 and M3 and detect position detection signals, which indicate the position of the movable stage 72 (image sensor 50) in the optical-axis orthogonal plane. The y-directional position and inclination (rotation) of the movable stage 72 (image sensor 50) are detected by the Hall sensors H1 and H2, and the x-directional position of the movable stage 72 (image sensor 50) is detected by the Hall sensor H3. The camera CPU 100 controls, via the shake-correction drive controller 73, the driving of the image-shake correction device 70, which moves the image sensor 50 within a plane orthogonal to the optical axis, based on shake detection signals detected by the gyro sensor (not shown in the drawings) that indicate shake/vibrations applied to the camera body 20 in a plane orthogonal to the optical axis, and position-detection signals that indicate the position of the image sensor 50 within a plane orthogonal to the optical axis detected by the Hall sensors H1, H2 and H3. Accordingly, the imaging position of the object image on the image sensor 50 can be displaced to correct image shake that is caused by hand shake/vibrations. In the illustrated embodiment, this operation is referred to as an "image-shake correction operation (image-shake correction drive) of the image-sensor 50".

In the image-shake correction device 70 of the illustrated embodiment, the image sensor 50 is driven along a predetermined path in a plane that is orthogonal to the optical axis Z of the photographing optical system, to provide an optical low-pass filter effect (hereinafter referred to as a "LPF effect") by making an object light-bundle incident on a plurality of pixels, having different detection colors, of the image sensor 50. In the illustrated embodiment, this operation is referred to as a "low-pass filter operation (LPF operation/LPF driving) of the image sensor 50".

The image-shake correction device 70 of the illustrated embodiment carries out a "central-holding operation (central-holding drive) of the image sensor 50" which holds the image sensor 50 at the central position of the image-shake correction movement-range (image-shake correction driving-range). For example, when the "image-shake correction operation (image-shake correction drive) of the image-sensor 50" and the "LPF operation (LPF drive) of the image sensor 50" are both OFF, a photographing operation is performed with only the "central-holding operation (central-holding drive) of the image sensor 50" turned ON (even if image-shake correction is not carried out).

An embodiment is possible in which the "image-shake correction operation (image-shake correction drive) of the image-sensor 50", the "LPF operation (LPF drive) of the image sensor 50" and the "central-holding operation (central-holding drive) of the image sensor 50" are achieved as a combined operation (combined driving) thereof by the image-shake correction device 70, or in which only one of these operations are achieved by the image-shake correction device 70.

Figure 4:
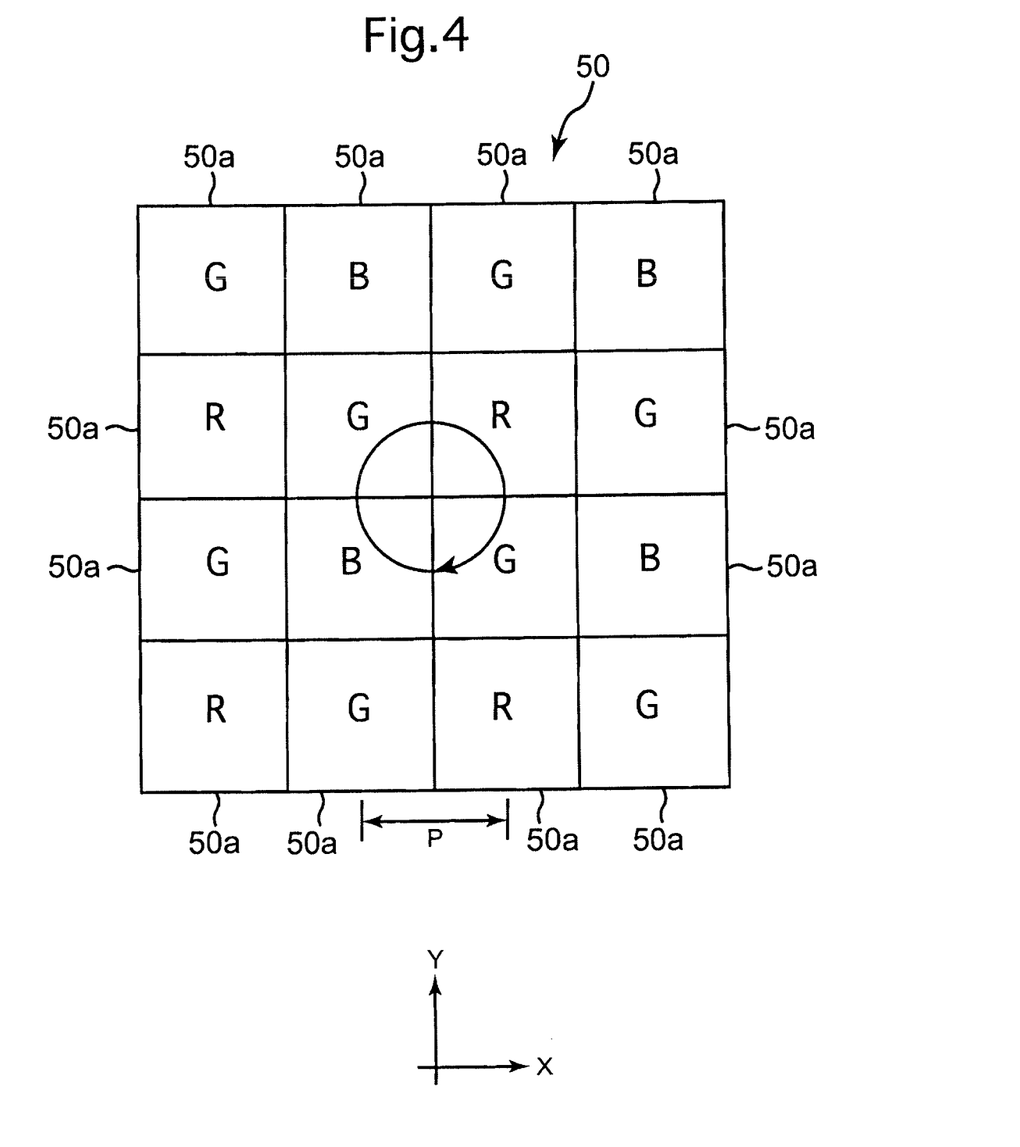
FIG. 4 is a diagram that indicates an optical low-pass filter effect that is provided by driving an image sensor to trace a rotationally symmetrical circular path about an optical axis of a photographing optical system.

The LPF operation for providing an LPF effect using the image sensor 50 via the image-shake correction device 70 driving the image sensor 50 in a circular path, which is rotationally symmetrical about the optical axis Z of the photographing optical system, will be hereinafter explained with reference to FIG. 4. In FIG. 4, the image sensor 50 is provided with a large number of pixels 50a arranged in a matrix form at a predetermined pixel pitch P on the light-receiving surface, and one color filter of color filters R, G and B, which are arranged in a Bayer array, is provided on a front surface of each pixel 50a. Each pixel 50a detects the color of the object light-rays that pass through one of the color filters R, G and B, on the front surface of the associated pixel 50a, and are incident thereon; namely, the color component (color zone) of the object light rays is photo-electrically converted and a charge corresponding to the strength (brightness) thereof is accumulated.

When the image sensor 50 is driven, during an exposure, along a predetermined circular path, since the object light rays (light bundle) that are equally incident on the center of each color filter R, G, B and G (pixels 50a) are incident on the four color filters R, G, B and G, a similar effect to that of an optical low-pass filter can be obtained. In other words, since the light rays that are incident on any of the color filters R, G, B and G (pixels 50a) are always also incident on surrounding color filters R, G, B and G (pixels 50a), an effect (LPF effect) that is the same as if the light rays are passing through an optical low-pass filter can be obtained.

Furthermore, by switching in a stepwise manner the driving range of the image sensor 50, i.e., the radius of the circular path that the image sensor 50 traces, the magnitude of the LPF effect carried out of the image sensor 50 can be switched in a stepwise manner. The LPF effect can be strengthened by increasing the radius of the circular path traced by the image sensor 50, and the LPF effect can be weakened by reducing the radius of the circular path traced by the image sensor 50. As shown in Table 1, in the illustrated embodiment, the driving range of the image sensor 50 together with the LPF effect can be switched between the four stages: "OFF", "Small", "Medium" and "Large". The driving range and of the image sensor 50 together with the LPF effect being "OFF" refers to the image sensor 50 not being driven, and hence refers to a state where no LPF effect can be obtained.

TABLE 1

| | | | | |
|---|---|---|---|---|
| Driving Range of Image Sensor 50 | OFF | Small | Medium | Large |
| LPF Effect via Image Sensor 50 | OFF | Small | Medium | Large |

The LCD 60 is provided on the rear side of the camera body 20. The LCD 60 performs a real-time display of a live view image, a playback display of a photographed image (still image, movie, and various other kinds of images), and a display for confirming and changing various settings of the digital camera 10.

The rear side of the camera body 20 is provided with operational switches 80 for confirming and changing various settings of the digital camera 10. Various settings such as the aperture value, shutter speed, ISO sensitivity, flash, and self-timer, etc., can be performed by operating the operational switches 80. The operational switches 80 include an LPF operation switch 82 for performing a setting or switching operation of the driving range of the image sensor 50 together with the LPF effect out of one of the four stages: "OFF", "Small", "Medium" and "Large" of Table 1. Furthermore, a shutter-release button 85, for performing a photographing operation by the digital camera 10, is provided on a top surface of the camera body 20.

The camera CPU 100 is provided with a photographing mode setter (processor) 110, a photographing controller 120, and an LPF controller 130.

The photographing mode setter 110 carries out a photographing mode setting via the digital camera 10 in accordance with an operation of the operational switches 80, carried out by a user (photographer).

The photographing mode setter 110 can perform one of a "still-image photographing mode" setting and a "specified photographing mode" setting other than the "still-image photographing mode" setting, as a photographing mode via the digital camera 10. In the present embodiment, the specified photographing mode includes a "movie-shooting mode" and a "HDR (High Dynamic Range) photographing mode".

The photographing mode setter 110 can set the photographing mode to a "live view mode" as a photographing standby mode for the still-image photographing mode and for the specified photographing mode (movie-shooting mode, or HDR photographing mode).

In the present specification, the "still-image photographing mode" refers to a photographing mode which stores a still image of an object in a memory (image memory 65), and is also used in consecutive shooting and in photographic bracketing, in addition to typical single-frame photography.

In the present specification, the "movie-shooting mode (specified photographing mode)" refers to a photographing mode in which a movie of the object is recorded in a memory (image memory 65).

In the present specification, the "HDR photographing mode (specified photographing mode)" refers to a photographing mode which obtains an image that gives the impression of an enlarged dynamic range of the image sensor 50 by obtaining a plurality of image data that was continuously shot, while the exposure conditions thereof where changed, and synthesized using these plurality of images so that halation and black defects do not appear within the photographic screen.

In the present specification, the "live view mode (photographing standby mode)" refers to a mode for displaying a movie of an object in real time on a display device (LCD 60) while temporarily storing the movie in a temporary storage memory (separate from the image memory 65) such as a DRAM, etc., and does not include a photographing mode that stores an image that is currently being displayed in a memory (image memory 65). Namely, in the case where an image of movie of an object is displayed in the display device (LCD 60) in real time while this movie of an object is temporarily stored in the memory (image memory 65), the photographing mode is no longer in "live view mode (photographing standby mode)" but is in another of the above-mentioned photographing modes. In other words, the photographing mode of the digital camera 10 simultaneously transfers to another of the photographing modes from the "live view mode (photographing standby mode)" when a photographing operation commences upon the shutter-release button 85 being depressed during the live view display.

The photographing controller 120 controls the various components within the camera body 20 in order to carry out a photographing operation in accordance with the photographing mode that has been set by the photographing mode setter 110.

When the photographing mode setter 110 has set the photographing mode to the "still-image photographing mode", the photographing controller 120 controls the movable mirror 40 to move to the mirror-up position via the mirror driver 43, carries out an exposure by opening the shutter 45 at predetermined conditions (aperture value and shutter speed), photographs a still image via the image sensor 50, and stores this image in the image memory 65.

When the photographing mode setter 110 has set the photographing mode to the "movie-shooting mode", the photographing controller 120 controls the movable mirror 40 to move to the mirror-up position via the mirror driver 43, opens the shutter 45 to maintain an exposed state, shoots a movie via the image sensor 50 and records this movie in the image memory 65.

When the photographing mode setter 110 has set the photographing mode to the "HDR photographing mode", the photographing controller 120 controls the movable mirror 40 to move to the mirror-up position via the mirror driver 43, obtains a plurality of image data via the image sensor 50 while changing the exposure conditions (aperture value and shutter speed), and upon selecting an image that has the highest luminance gradation out of the various components within the picture frame from the plurality of image data, the photographing controller 120 produces a synthesized image upon aligning the plurality of image data and performing contrast adjustments between each image; this synthesized image is stored in the image memory 65.

When the photographing mode setter 110 has set the photographing mode to the "live view mode", the photographing controller 120 controls the movable mirror 40 to move to the mirror-up position via the mirror driver 43, opens the shutter 45 to maintain an exposed state, shoots a movie via the image sensor 50 and displays this movie in the LCD 60 in real time. The photographing controller 120 does not allow the shot movie to be recorded in the image memory 65.

When the photographing mode setter 110 has not set the photographing mode to the "live view mode", the photographing controller 120 controls the movable mirror 40 to move to the mirror-down position via the mirror driver 43.

The LPF controller 130 performs a control that allows or prohibits the obtaining of an optical low-pass filter effect, by driving the image sensor 50 in a plane orthogonal to the optical axis via the image-shake correction device 70, in accordance with the photographing mode that has been set by the photographing mode setter 110.

More specifically, when the photographing mode setter 110 has set the photographing mode to the "still-image photographing mode", the LPF controller 130 allows the obtaining of an optical low-pass filter effect by driving the image sensor 50 in a plane orthogonal to the optical axis via the image-shake correction device 70. Namely, the LPF controller 130 enables the operation of the LPF operation switch 82, and sets the driving range of the image sensor 50 together with the LPF effect to one of the four stages of "OFF", "Small", "Medium" and "Large" of Table 1, in accordance with the operation of the LPF operation switch 82.

Whereas, when the photographing mode setter 110 has set the photographing mode to the "movie-shooting mode (specified photographing mode)", the "HDR photographing mode (specified photographing mode)", or the "live view mode (photographing standby mode)", the LPF controller 130 prohibits an optical low-pass filter effect from being obtained by driving the image sensor 50 in a plane that is orthogonal to the optical axis via the image-shake correction device 70. In other words, the LPF controller 130 deactivates the operation of the LPF operation switch 82 (ignores the setting carried out by the LPF operation switch 82), and forcibly sets the driving range of the image sensor 50 together with the LPF effect to "OFF", regardless of an operation of the LPF operation switch 82.

When the photographing mode set by the photographing mode setter 110 has transferred to the "still-image photographing mode" from the "movie-shooting mode (specified photographing mode)", the "HDR photographing mode (specified photographing mode)", or the "live view mode (photographing standby mode)", the LPF controller 130 switches the deactivated state of the operation of the LPF operation switch 82 to an activated state, and sets the driving range of the image sensor 50 together with the LPF effect to one of the four stages of "OFF", "Small", "Medium" and "Large" of Table 1, in accordance with the operation of the LPF operation switch 82 (the original setting when the operation of the LPF operation switch 82 was activated).

For example, in the case where the photographing mode setter 110 has set the photographing mode to the "still-image photographing mode", and the driving range of the image sensor 50 together with the LPF effect has been set to "Large" of Table 1 via the LPF operation switch 82, it is conceivable for the photographing mode that is set by the photographing mode setter 110 to be changed to the "movie-shooting mode (specified photographing mode)" and thereafter be changed to the "still-image photographing mode". In such a case, while the photographing mode setter 110 sets the photographing mode at the "movie-shooting mode (specified photographing mode)", the LPF controller 130 ignores the setting carried out by the LPF operation switch 82, the LPF drive (low-pass selector drive) is prohibited, and when the photographing mode setter 110 sets the digital camera 10 to the "still-image photographing mode", the driving range of the image sensor 50 together with the LPF effect is again set to "Large" of Table 1.

In regard to the prevention of moire and false color, in the "still-image photographing mode" of the digital camera 10, when the LPF function is used by driving the image sensor 50, moire and false color can be removed as intended. However, in the "specified photographing mode (movie-shooting mode or HDR photographing mode)" and the "live view mode" of the digital camera 10, when the LPF function is used by driving the image sensor 50, not only can moire and false color not be removed, there was even the case where the moire and false color would accentuate, so that the image would be unnatural. Based on this knowledge, the inventor of the present invention has successfully obtained a high-quality still image with moire and false color actively removed by using the LPF function in the "still-image photographing mode" of the digital camera 10, and in the "specified photographing mode (movie-shooting mode or HDR photographing mode)" or the "live view mode" of the digital camera 10 has successfully obtained a specified photographic image of reliable quality with adverse influence of moire and false color reduced as much as possible by, conversely, not using the LPF function.

The principle behind not being able to obtain a desired LPF effect when using the LPF function by driving the image sensor 50 in the "movie-shooting mode" and in the "live view mode" of the digital camera 10 will be herein discussed with reference to FIGS. 5 through 8.

Figure 5:
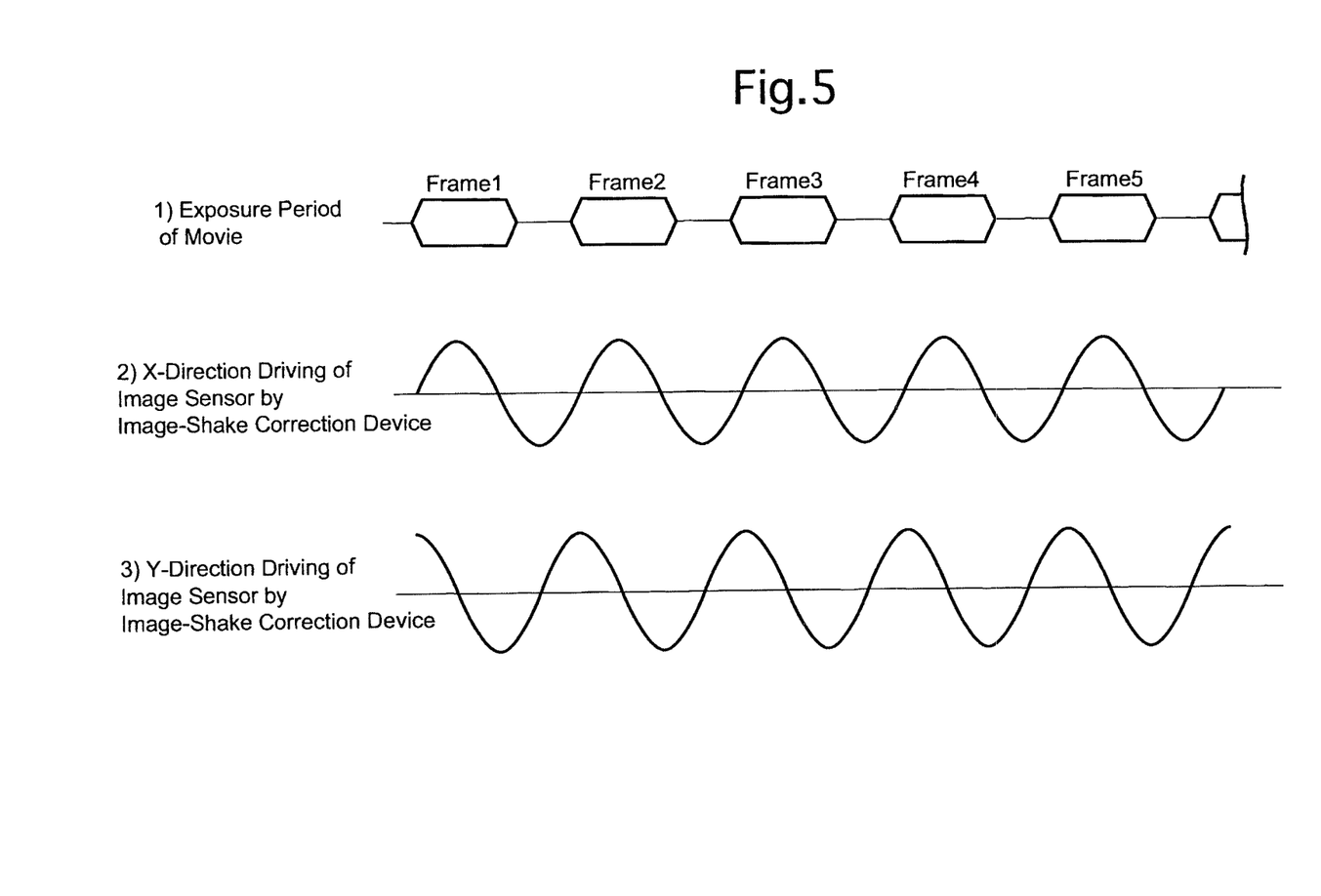
FIG. 5 is a diagram showing the relationship between an exposure period of frames during a movie shooting operation and a drive period of the image sensor in a plane that is orthogonal to the optical axis (XY plane) via an image-shake correcting device, and showing a case where the exposure period and the drive period are in synchronization.
Figure 6:
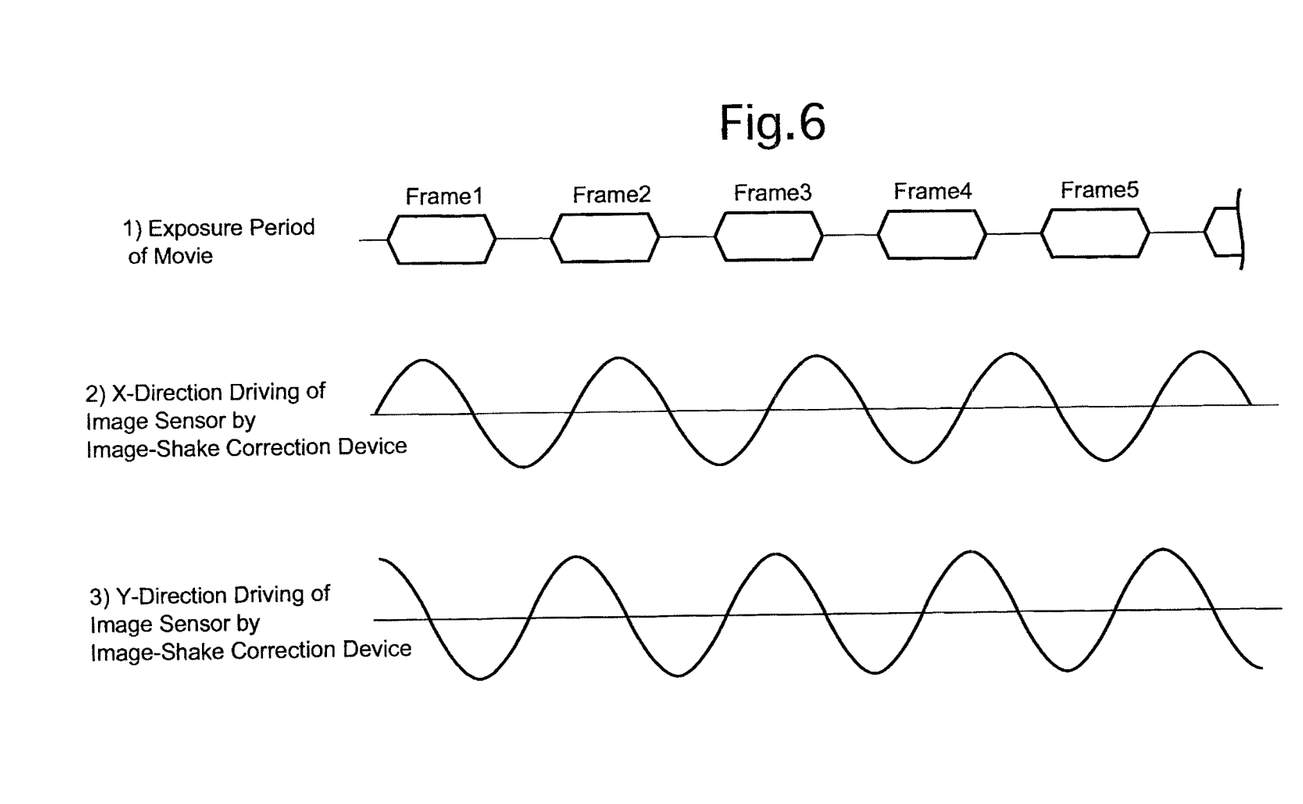
FIG. 6 is a diagram showing the relationship between an exposure period of frames during a movie shooting operation and a drive period of the image sensor in a plane that is orthogonal to the optical axis (XY plane) via an image-shake correcting device, and showing a case where the exposure period and the drive period are not in synchronization.

FIG. 5 and FIG. 6 each show the relationship between an exposure period of frames during a movie shooting operation and a drive period of the image sensor 50 in a plane that is orthogonal to the optical axis (XY plane) via the image-shake correcting device 70. FIG. 5 shows a case where the exposure period and the drive period are in synchronization, and FIG. 6 shows a case where the exposure period and the drive period are not in synchronization. In both FIG. 5 and FIG. 6, images are captured periodically for frames 1 through 5 during movie shooting at a frequency of 60 Hz, and the image sensor 50 is driven in the x-direction and y-direction in a sinusoidal wave form. The amplitude of the sinusoidal wave is determined in accordance with a desired moire removal effect so that double the amplitude of the sinusoidal wave (=Max.–Min.) becomes equal to the amount of movement of 1 through 1.5 pixels. Furthermore, since the driving in the x-direction is advanced (shifted in phase) by 90° from the driving in the y-direction, the image sensor 50 moves while tracing a circular path. The movie images that are shot in each of the cases in FIG. 5 and in FIG. 6 will be described hereinafter.

Figure 7A:
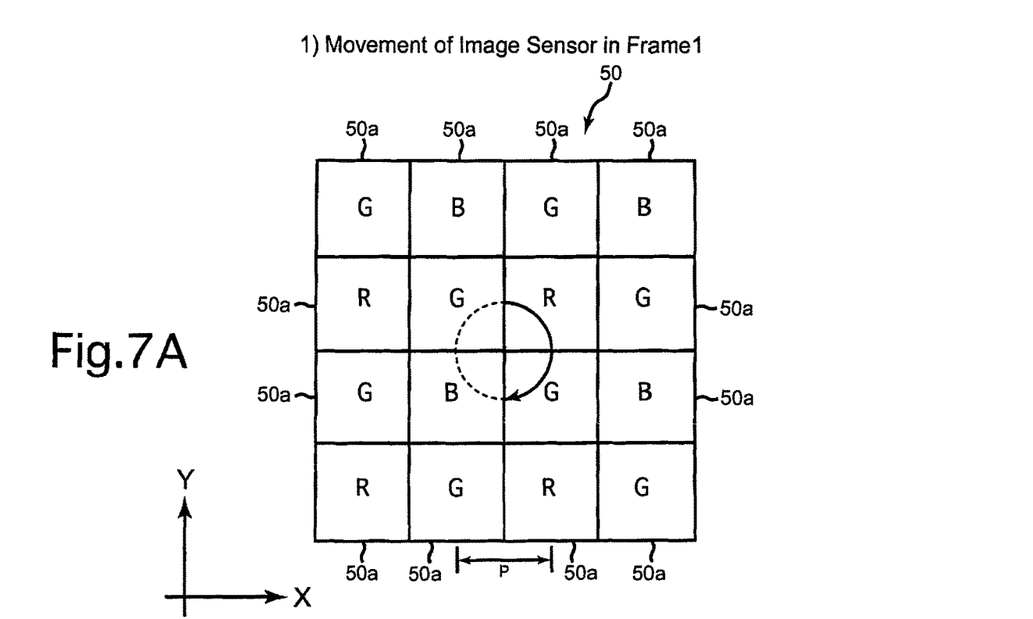
FIGS. 7A and 7B are diagrams showing a comparison on how one light ray moves during an exposure moves with respect to the image sensor between frame 1 and frame 5 of FIG. 5.
Figure 7B:
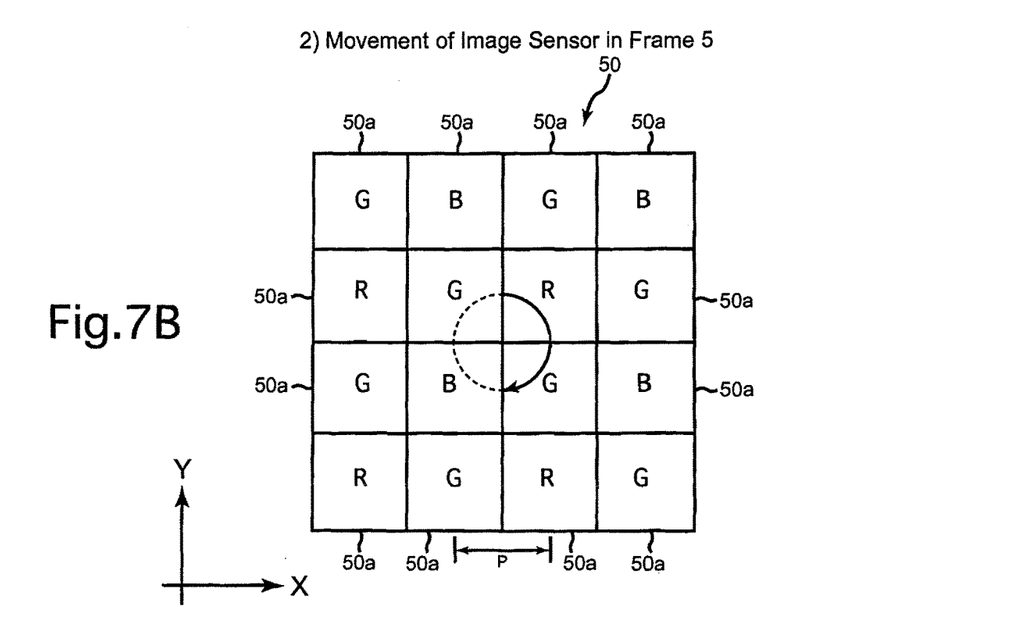
Figure 8A:
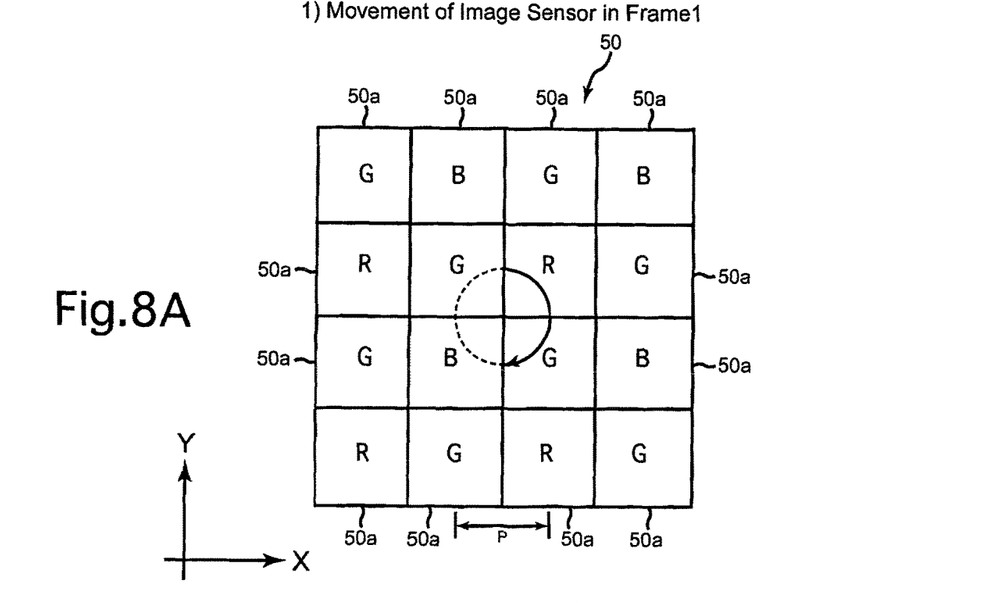
FIGS. 8A and 8B are diagrams showing a comparison on how one light ray moves during an exposure moves on the image sensor between frame 1 and frame 5 of FIG. 6.
Figure 8B:
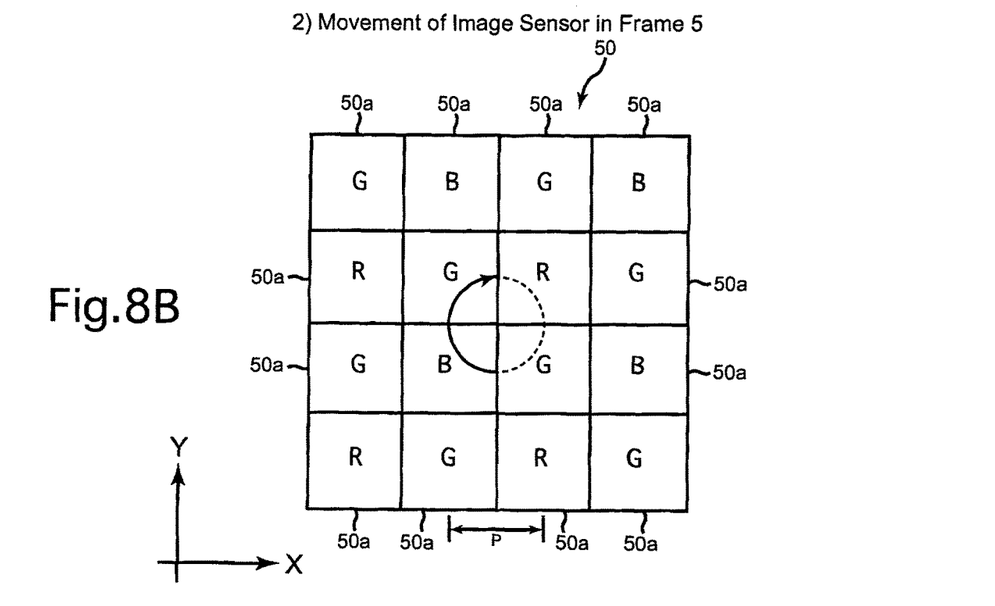

FIGS. 7A and 7B show a comparison of how one light ray moves on the image sensor 50 during an exposure in frame 1 and frame 5 of FIG. 5, and FIGS. 8A and 8B show a comparison of how one light ray moves on the image sensor 50 during an exposure in frame 1 and frame 5 of FIG. 6. In reality, the image sensor 50 actually moves, however, the relative movement of the light ray is depicted. As mentioned above, the image sensor 50 is provided with a large number of pixels 50a arranged in a matrix form at a predetermined pixel pitch P on the light-receiving surface, and one color filter of color filters R, G and B, which are arranged in a Bayer array, is provided on a front surface of each pixel 50a. The image sensor 50 performs a circular movement at a diameter of approximately 1 pixel, and moves along the circle shown as a solid line and a broken line in FIGS. 7A through 8B.

In FIG. 5, since approximately half of the frame period depicts the exposure time, the movement path of the image sensor 50 during an exposure does not form a circle, but forms a half-period arc, as shown by the solid line in FIGS. 7A and 7B. Upon comparing the movement paths of frame 1 and frame 5, since the exposure period of each frame and the driving period of the image sensor 50 are synchronized, the movement path of the image sensor 50 is the same for frame 1 and frame 5. However, in this case, since the image sensor 50 is only moving on the R and G pixels of RGB so that the B color information is lacking, even if the light ray corresponding to this movement path were white light, yellow false color would occur. Although yellow false color would occur in the movie, since the movement path of the image sensor 50 is the same at frame 1 and at frame 5, a change in color between different frames would not occur.

In FIG. 6, since the exposure period of each frame and the driving period of the image sensor 50 are not synchronized, a driving phase shift of the image sensor 50 of 180° occurs between frame 1 and frame 5. Accordingly, as shown in FIGS. 8A and 8B, the movement path of the light ray on the image sensor 50 shifts by a half period, so that at frame 1 a yellow false color occurs as in the case of FIGS. 7A and 7B, however, due to the lack of R color information in frame 5, this is changed to a cyan false color. Therefore, in the driving conditions shown in FIG. 6, a phenomenon occurs in which the false color changes from yellow to cyan, and from cyan to yellow every fifth frame of the movie.

As described above, during movie-shooting or live view photography, when the image sensor 50 is driven by the image-shake correction device 70, if the exposure period of each frame and the driving period of the image sensor 50 are not in synchronization, an undesirable phenomenon occurs in which the color changes during a change in time. Furthermore, having the exposure period of each frame and the driving period of the image sensor 50 always in complete synchronization adds restrictions to the control of either the movie shooting operation, live view photography, or the LPF function, which is not desirable.

Furthermore, in the case of performing HDR photography, a plurality of images that were photographed while changing the shutter speed are synthesized. In the example shown in FIGS. 8A and 8B, although different false colors occurred due to a shift in the period, the movement path of the light rays differs between images even if the shutter speed is changed, so that false color occurs differently between these different images and the amount of LPF effect differs. Accordingly, an unnatural HDR processed image occurs.

Figure 9:
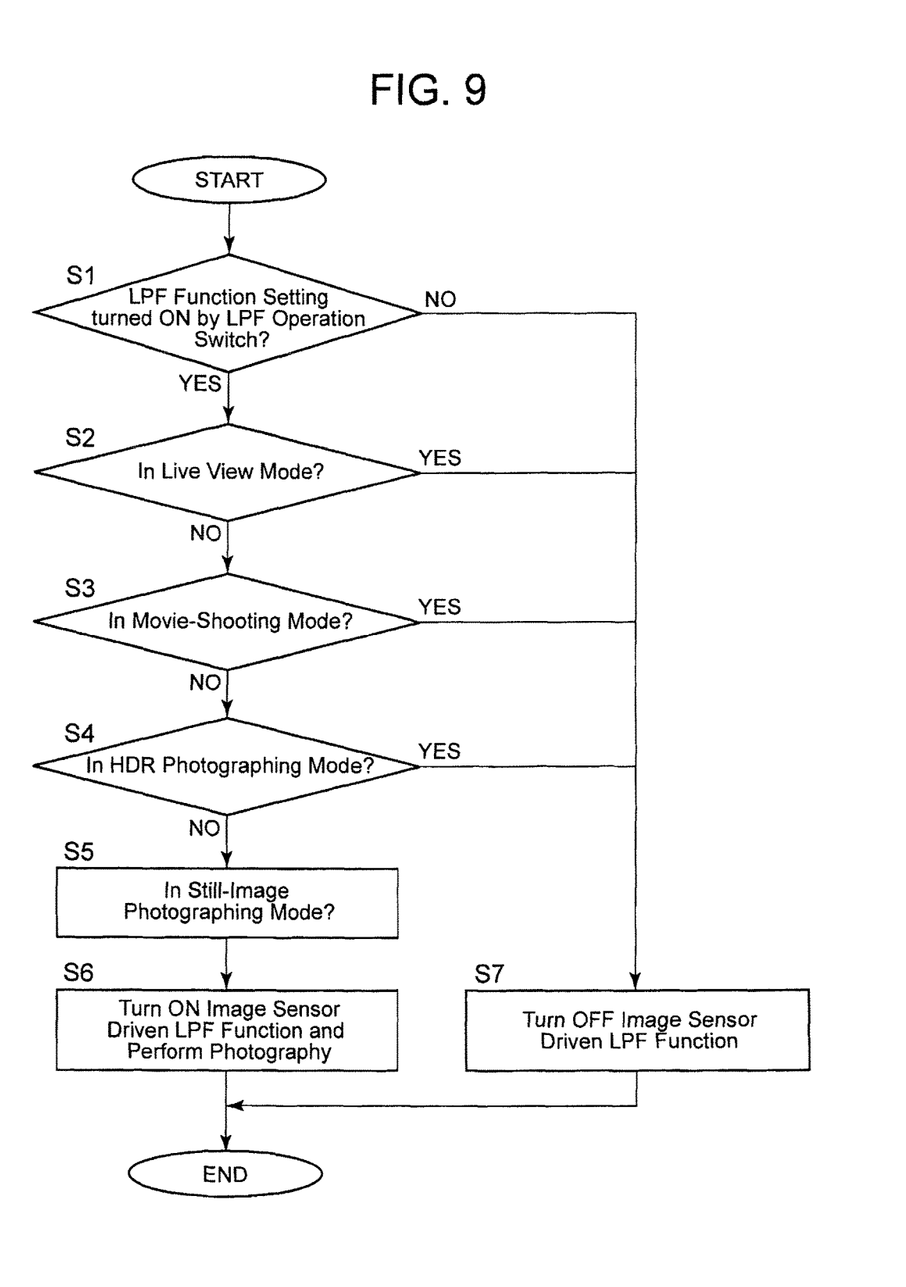
FIG. 9 is a flowchart showing an operation (control method) of the digital camera according to the present invention.

The operation (control method) of the digital camera 10, of the present invention, will be herein described with reference to FIG. 9.

The LPF controller 130 determines whether or not the setting of the LPF function, via the driving of the image sensor 50, is ON via an operation of the LPF operation switch 82; i.e., whether the driving range of the image sensor 50 together with the LPF effect have been set to one of "OFF", "Small", "Medium" and "Large" of Table 1 (step S1).

When the LPF controller 130 determines that the setting of the LPF function (which is performed by driving the image sensor 50) is "OFF", i.e., when the driving range of the image sensor 50 together with the LPF effect have been set to "OFF" of Table 1 (step S1: NO), the LPF function (which is performed by driving the image sensor 50) is turned OFF (step S7).

When the LPF controller 130 determines that the setting of the LPF function (which is performed by driving the image sensor 50) is "ON", i.e., when the driving range of the image sensor 50 together with the LPF effect have been set to one of "Small", "Medium" and "Large" of Table 1 (step S1: YES), it is determined that the digital camera 10 is in the "live view mode" (step S2).

When the LPF controller 130 determines that the digital camera 10 is in the "live view mode" (step S2: YES), the operation of the LPF operation switch 82 is deactivated, and the LPF function (which is performed by driving the image sensor 50) is forcibly turned OFF (step S7).

If the user (photographer) depresses the shutter-release button 85 during a live view display, still-image photography, movie-shooting or HDR photography is carried out, and the photographing mode of the digital camera transfers from the "live view mode" to one of the "still-image photographing mode", the "movie-shooting mode" or the "HDR photographing mode" (step S2: NO).

When the LPF controller 130 determines that the digital camera 10 is in the "movie-shooting mode" (step S3: YES), the operation of the LPF operation switch 82 is deactivated, and the LPF function (which is performed by driving the image sensor 50) is forcibly turned OFF (step S7). Thereafter, with the LPF function turned OFF, a movie-shooting operation is carried out under the control of the photographing controller 120.

When the LPF controller 130 determines that the digital camera 10 is in the "HDR photographing mode" (step S3: NO; step S4: YES), the operation of the LPF operation switch 82 is deactivated, and the LPF function (which is performed by driving the image sensor 50) is forcibly turned OFF (step S7). Thereafter, with the LPF function turned OFF, a HDR photographing operation is carried out under the control of the photographing controller 120.

When the LPF controller 130 determines that the digital camera 10 is in the "still-image photographing mode" (step S3: NO; step S4: NO; step S5: YES), the operation of the LPF operation switch 82 is activated, and the LPF function (which is performed by driving the image sensor 50) is turned ON in accordance with the operation of the LPF operation switch 82 (step S6). Thereafter, with the LPF function turned ON, a still-image photographing operation is carried out under the control of the photographing controller 120.

Furthermore, when the shutter-release button 85 is depressed during a movie-shooting operation in the "movie-shooting mode", the photographing mode setter 110 cancels the setting of "movie-shooting mode" and can set the photographing mode to the "still-image photographing mode" (a still-image photographing operation can interrupt a movie-shooting operation). In such a case, since the photographing mode is now the "still-image photographing mode", if the LPF function (which is performed by driving the image sensor 50) is set at ON in step S1 (step S1: YES), the still-image photographing operation is performed while using the LPF function, and if the LPF function (which is performed by driving the image sensor 50) is set at OFF at step S1 (step S1: NO), the still-image photographing operation is performed without using the LPF function.

In the above-described embodiment, an example is described in which the image sensor 50 is driven in a plane that is orthogonal to the optical axis, with the image sensor 50 acting as a "movable member/shake-correction member"; however, the present invention is not limited thereto. For example, it is possible for a lens element constituting part of the photographing lens group (photographing optical system) 32 to serve as a "movable member/shake-correction member", in which this lens element (optical element) is driven in a plane that is orthogonal to the optical axis by a voice coil motor (drive mechanism) provided within the interchangeable photographing lens 30. Alternatively, it is possible for both the image sensor 50 and a lens element constituting part of the photographing lens group (photographing optical system) 32 to serve as a "movable member/shake-correction member", which is driven in a plane that is orthogonal to the optical axis. In either configuration, image shake can be corrected by displacing the imaging position of an object image on the image sensor 50, while obtaining an optical low-pass filter effect with the object light bundle incident on a plurality of pixels, having different detection colors, of the image sensor 50.

Although in the above-described embodiment an example is given in which the image sensor (movable member/image-shake correction member) 50 is driven, via the image-shake correction device (driver, driving mechanism) 70, in a plane that is orthogonal to the optical axis in order to carry out an image-shake correction operation and an LPF operation, the direction in which the image sensor 50 is to be driven is not limited to such a direction, so long as the direction is different to that of the optical axis of the photographing optical system.

Although in the above-described embodiment an example is given in which the predetermined path traced by the image sensor 50 is a circular path that is rotationally symmetrical about the optical axis Z of the photographing optical system, the predetermined path is not limited thereto. For example, a square path that is rotationally symmetrical about the optical axis Z of the photographing optical system or a reciprocal linear-movement path on a plane that is orthogonal to the optical axis Z of the photographing optical system are also acceptable.

Although in the above-described embodiment an example is given in which both a "movie-shooting mode" and an "HDR photographing mode" are provided in the digital camera 10 as "specified photographing modes", a configuration is possible in which only one of these modes is provided as a "specified photographing mode".

In the above-described embodiment an example is described in which a photographing operation is performed while prohibiting the LPF driving operation in a photographing mode, such as in the "movie-shooting mode" and in the "HDR photographing mode", etc., in which problems occur such as deterioration, etc., in image quality in the case where a shift in period occurs or at a high shutter speed; however, the present invention is not limited thereto. It is possible to perform a photographing operation while prohibiting the LPF driving operation in other photographing modes only during when problems occur such as deterioration, etc., in image quality in the case where a shift in period occurs or at a high shutter speed.

Although in the above-described embodiment an example is given in which the image-shake correction device (driver, drive mechanism) 70 is configured by the magnets M1, M2 and M3 and the yokes Y1, Y2 and Y3 being mounted onto the mount support plate 71, and the drive coils C1, C2 and C3 being mounted onto the movable stage 72, the positional relationship thereof can be reversed by mounting the magnets and the yokes onto the movable stage and mounting the drive coils onto the mount support plate.

Although in the above-described embodiment an example is given in which the body 20 and the interchangeable photographing lens 30 are detachably attached to each other (lens interchangeable), a configuration is possible in which the body 20 and the interchangeable photographing lens 30 are not detachably attached (non lens-interchangeable).

In the above-described embodiment an example is given in which the photographing apparatus of the present invention is applied to the digital SLR camera 10 provided with the movable mirror (quick-return mirror) 40. However, the photographing apparatus of the present invention can likewise also be applied to a so-called mirrorless digital camera, in which a movable mirror (quick-return mirror) is omitted. Fundamentally, in a mirrorless digital camera, since the live view mode commences as soon as the camera power switch is turned ON, immediately after the camera power switch (until the live view image is displayed), the LPF function is set to OFF.

Although in the above-described embodiment an example is given in which the driving range of the image sensor 50 together with the LPF effect can be switched between the four stages: "OFF", "Small", "Medium" and "Large", it is possible to set the driving range of the image sensor 50 together with the LPF effect more broadly or more finely. For example, a configuration in which the driving range of the image sensor 50 together with the LPF effect is switched between two stages such as "OFF" and "ON", or a configuration in which the driving range of the image sensor 50 together with the LPF effect is switched between seven stages such as "OFF", "1", "2", "3", "4", "5" and "6" (the larger the number the greater the driving range of the image sensor 50 together with the LPF effect) is possible.

Although the digital camera 10 has been described herein as a photographing apparatus to which the present invention is applied, the present invention can also be applied to any device which includes a lens system, an image sensor and an image processor, for example: a smart device that is provided with an in-built digital camera (photographing apparatus) such as a smart phone or a tablet computer, or a video camera that is capable of taking a still image (picture).

INDUSTRIAL APPLICABILITY

It is desirable for the photographing apparatus and the photographing control method according to the present invention to be used in a photographing apparatus, and photographing control method therefor, such as a digital camera, etc.

REFERENCE SIGNS LIST

10 Digital SLR camera (Photographing apparatus)
20 Camera body
30 Interchangeable photographing lens
32 Photographing lens group (photographing optical system/movable member/shake-correction member)
34 Lens CPU
40 Movable mirror (quick-return mirror)
40X Rotational pivot
41 Pentaprism
42 Eyepiece lens element
43 Mirror driver
45 Shutter
46 Shutter driver
50 Image sensor (movable member/shake-correction member)
50a Pixels
R G B Color filters
51 Image-sensor drive controller
60 LCD
65 Image memory
70 Image-shake correction device (driver, driving mechanism)
71 Mount support plate
72 Movable stage
73 Shake-correction drive controller (drive-signal generator)
M1 M2 M3 Magnets
Y1 Y2 Y3 Yokes
C1 C2 C3 Drive coils
H1 H2 H3 Hall sensors
80 Operational switches
82 LPF operation switch
85 Shutter-release button
100 Camera CPU
110 Photographing mode setter (processor)
120 Photographing controller
130 LPF controller (LPF control device)

The invention claimed is:

1. A photographing apparatus comprising:
an image sensor, which converts an object image that is formed by a photographing optical system into electrical pixel signals;
a driver configured to obtain an optical low-pass filter effect via an object light-bundle being incident on a plurality of pixels of said image sensor by driving moving a movable member in a direction that is different from an optical axis of said photographing optical system, wherein said movable member includes at least one of a lens element, constituting part of said photographing optical system, and said image sensor;
a processor configured to set a photographing mode to one of a still-image photographing mode and a specified photographing mode other than said still-image photographing mode; and
an LPF controller configured to allow said optical low-pass filter effect to be obtained by moving said movable member via said driver when said processor has set the photographing mode to said still-image photographing mode, and configured to prohibit an obtaining of said optical low-pass filter effect, obtained by moving said movable member via said driver, when said processor has set the photographing mode to said specified photographing mode.

2. The photographing apparatus according to claim 1, wherein said processor is configured to set the photographing mode to a live view mode as a photographing standby mode in said still-image photographing mode and in said specified photographing mode, and
wherein said LPF controller prohibits an obtaining of said optical low-pass filter effect, obtained by moving said movable member via said driver, when said processor has set the photographing mode to said live view mode.

3. The photographing apparatus according to claim 1, wherein said specified photographing mode includes at least one of a movie-shooting mode and an HDR photographing mode.

4. The photographing apparatus according to claim 1, further comprising an LPF operation switch for carrying out a switching operation between obtaining and not obtaining said optical low-pass filter effect, obtained by moving said movable member via said driver, wherein said LPF controller activates the operation of said LPF operation switch when said processor has set the photographing mode to said still-image photographing mode, and deactivates the operation of said LPF operation switch when said processor has set the photographing mode to said specified photographing mode.

5. The photographing apparatus according to claim 1, wherein said specified photographing mode includes a movie-shooting mode, and
wherein said processor cancels the setting of said movie-shooting mode and sets the photographing mode to said still-image photographing mode when a shutter release button is depressed during a movie-shooting operation in said movie-shooting mode.

6. A photographing control method of a photographing apparatus, which includes an image sensor, which converts an object image that is formed by a photographing optical system into electrical pixel signals; and a driver configured to obtain an optical low-pass filter effect via an object light-bundle being incident on a plurality of pixels of said image sensor by moving a movable member in a direction that is different from an optical axis of said photographing optical system, wherein said movable member includes at least one of a lens element, constituting part of said photographing optical system, and said image sensor, said photographing control method comprising:
setting one of a still-image photographing mode and a specified photographing mode other than said still-image photographing mode; and
an LPF control which allows said optical low-pass filter effect to be obtained by moving said movable member via said driver when the photographing mode is set to said still-image photographing mode, and which prohibits an obtaining of said optical low-pass filter effect, obtained by moving said movable member via said driver, when the photographing mode is set to said specified photographing mode.

7. The photographing control method of a photographing apparatus according to claim 6, wherein the photographing mode is set to a live view mode as a photographing standby mode in said still-image photographing mode and in said specified photographing mode; and
wherein said LPF control prohibits an obtaining of said optical low-pass filter effect, obtained by moving said movable member via said driver, when the photographing mode is set to said live view mode.

8. The photographing control method of a photographing apparatus according to claim 6, wherein said specified photographing mode includes at least one of a movie-shooting mode and an HDR photographing mode.

9. The photographing control method of a photographing apparatus according to claim 6, further comprising performing a switching operation between obtaining and not obtaining said optical low-pass filter effect, obtained by moving said movable member via said driver,
wherein said LPF control activates the operation in said switching operation when the photographing mode is set to said still-image photographing mode, and deactivates said switching operation when the photographing mode is set to said specified photographing mode.

10. The photographing control method of a photographing apparatus according to claim 6, wherein said specified photographing mode includes a movie-shooting mode, and
wherein the setting of said movie-shooting mode is cancelled and the photographing mode is set to said still-image photographing mode when a shutter release button is depressed during a movie-shooting operation in said movie-shooting mode.

* * * * *